United States Patent
Zack et al.

(10) Patent No.: US 7,061,734 B2
(45) Date of Patent: Jun. 13, 2006

(54) CLASS II BUS NEGATIVE TRANSIENT PROTECTION

(75) Inventors: Gary E. Zack, Novi, MI (US); Harold R. Macks, Redford, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 457 days.

(21) Appl. No.: 10/653,439

(22) Filed: Sep. 2, 2003

(65) Prior Publication Data

US 2004/0160712 A1 Aug. 19, 2004

Related U.S. Application Data

(60) Provisional application No. 60/452,190, filed on Mar. 5, 2003, provisional application No. 60/447,826, filed on Feb. 14, 2003.

(51) Int. Cl.
*H02H 9/00* (2006.01)

(52) U.S. Cl. .......................................... 361/56
(58) Field of Classification Search ............... 361/56

See application file for complete search history.

(56) References Cited

U.S. PATENT DOCUMENTS

| | | | |
|---|---|---|---|
| 4,460,935 A | 7/1984 | Uehira | 361/91 |
| 5,126,593 A | 6/1992 | Mahler | 307/443 |
| 5,166,852 A | 11/1992 | Sano | 361/42 |
| 5,497,284 A | 3/1996 | Le Van Suu | 361/42 |
| 5,508,872 A | 4/1996 | Khoo et al. | 361/42 |
| 6,115,831 A | 9/2000 | Hanf et al. | 734/43 |
| 6,154,081 A | 11/2000 | Pakkala et al. | 327/309 |
| 6,154,082 A | 11/2000 | Bernard et al. | 327/310 |

*Primary Examiner*—Stephen W. Jackson
*Assistant Examiner*—Boris Benenson
(74) *Attorney, Agent, or Firm*—Dickinson Wright PLLC

(57) ABSTRACT

To protect the class II integrated circuit bus from negative transients, the present invention uses a clamp circuit which is biased from the battery and referenced to ground as opposed to being biased and referenced to ground. Thus, the current path is not from ground to the bus pin. Instead, it is from the battery through a blocking diode, a transistor, a resistor and a plurality of diodes to the bus pin yet referenced to ground. In a preferred embodiment, the present invention consists of a transient protection circuit including a reference diode with its cathode connected to ground, a transistor biased as a current source having its output terminal operably connected to an anode of the reference diode, and at least a second diode operably connected between the anode of the reference diode and a bus pin, whereby the transistor supplies current when a module ground is intact.

20 Claims, 6 Drawing Sheets

CLASS II BUS NEGATIVE TRANSIENT PROTECTION

CROSS-REFERENCE TO RELATED APPLICATIONS

This application claims benefit of U.S. Provisional Application Ser. Nos. 60/447,826, filed Feb. 14, 2003, and 60/452,190, filed Mar. 5, 2003.

BACKGROUND OF THE INVENTION

1. Technical Field

The present invention relates to transient protection circuits. More particularly, it relates to a method of protecting integrated circuits from transients.

2. Discussion

The automotive industry uses a communication protocol in its automobiles called class II. Class II is a single wire vehicle communication network, which is a variant of the SAE J1850 standard. The various class II integrated circuits are all powered by battery potential and have a pin bus that communicates to the other electronic modules in the vehicles that utilize class II communication. Previous designs have used a dual diode transient protection circuit to protect integrated circuits from negative transients. Unfortunately, a negative transient can cause the bus to lock up when an open ground fault occurs.

SUMMARY OF THE INVENTION

To protect the class II integrated circuit bus from negative transients, the present invention uses a clamp circuit which is biased from the battery and referenced to ground as opposed to being biased and referenced to ground. Thus, the current path is not from ground to the bus pin. Instead, it is from the battery through a blocking diode, a transistor, a resistor and a plurality of diodes to the bus pin yet referenced to ground.

The present invention comprises a method of protecting an integrated circuit from a transient voltage, and includes the steps of supplying battery current dependent on the presence of an intact module ground to the anode of a reference diode, the cathode of which is referenced to ground, forward biasing the diode to create a voltage referenced to ground, and clamping a bus pin to this reference voltage using at least one diode.

In another preferred embodiment, the invention comprises a transient protection circuit including a reference diode with its cathode connected to ground, a transistor biased as a current source having its output terminal operably connected to an anode of the reference diode, and at least a second diode operably connected between the anode of the reference diode and a bus pin, whereby the transistor supplies current when a module ground is intact.

In a further preferred embodiment, the invention comprises a transient protection circuit including a reference diode with its cathode connected to ground, a transistor biased as a switch having its output terminal operably connected to a first end of a resistor whereby a current source is formed, a second end of the resistor operably connected to an anode of the reference diode, and at least a second diode operably connected between the anode of the reference diode and a bus pin.

In another preferred embodiment, the invention further comprises a capacitor operably connected in parallel with the reference diode, whereby the capacitor supplies current to clamp the bus pin until a transient voltage has passed.

In a further preferred embodiment, the at least a second diode comprises a second and a third diode operably connected in series.

In another preferred embodiment, the at least a second diode comprises a second, a third and a fourth diode operably connected in series.

In a further preferred embodiment, the invention comprises an electronic module and a transient protection circuit. The electronic module includes an integrated circuit having a bus pin, a battery pin, and a ground pin, and the transient protection circuit includes a reference diode with its cathode connected to ground, a transistor biased as a current source having its output terminal operably connected to an anode of the reference diode, and at least a second diode operably connected between the anode of the reference diode and the bus pin, whereby the transistor supplies current when a module ground is intact.

In another preferred embodiment, the invention comprises an electronic module and a transient protection circuit. The electronic module includes an integrated circuit having a bus pin, a battery pin, and a ground pin. The transient protection circuit includes a reference diode with its cathode connected to ground, a transistor biased as a switch in series with a resistor, whereby a current source is formed having its output terminal operably connected to an anode of the reference diode, and at least a second diode operably connected between the anode of the reference diode and the bus pin, whereby the transistor supplies current when a module ground is intact.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

The automotive industry uses a communication protocol in its automobiles called class II. Class II is a single wire vehicle communication network, which is a variant of the SAE J1850 standard. The various class II integrated circuits (IC) are all powered by battery potential and have a pin bus that communicates to the other electronic modules in the vehicles that utilize class II communication. In a preferred embodiment, an MC68HC58 chip is used as the class II integrated circuit. The different electronic modules 15, 35, 50 in an automobile's electronics 10 communicate using this protocol. For example, the instrument cluster (which includes an odometer, a speedometer, etc.) might communicate with the engine module using this class II communication.

Figure 1:
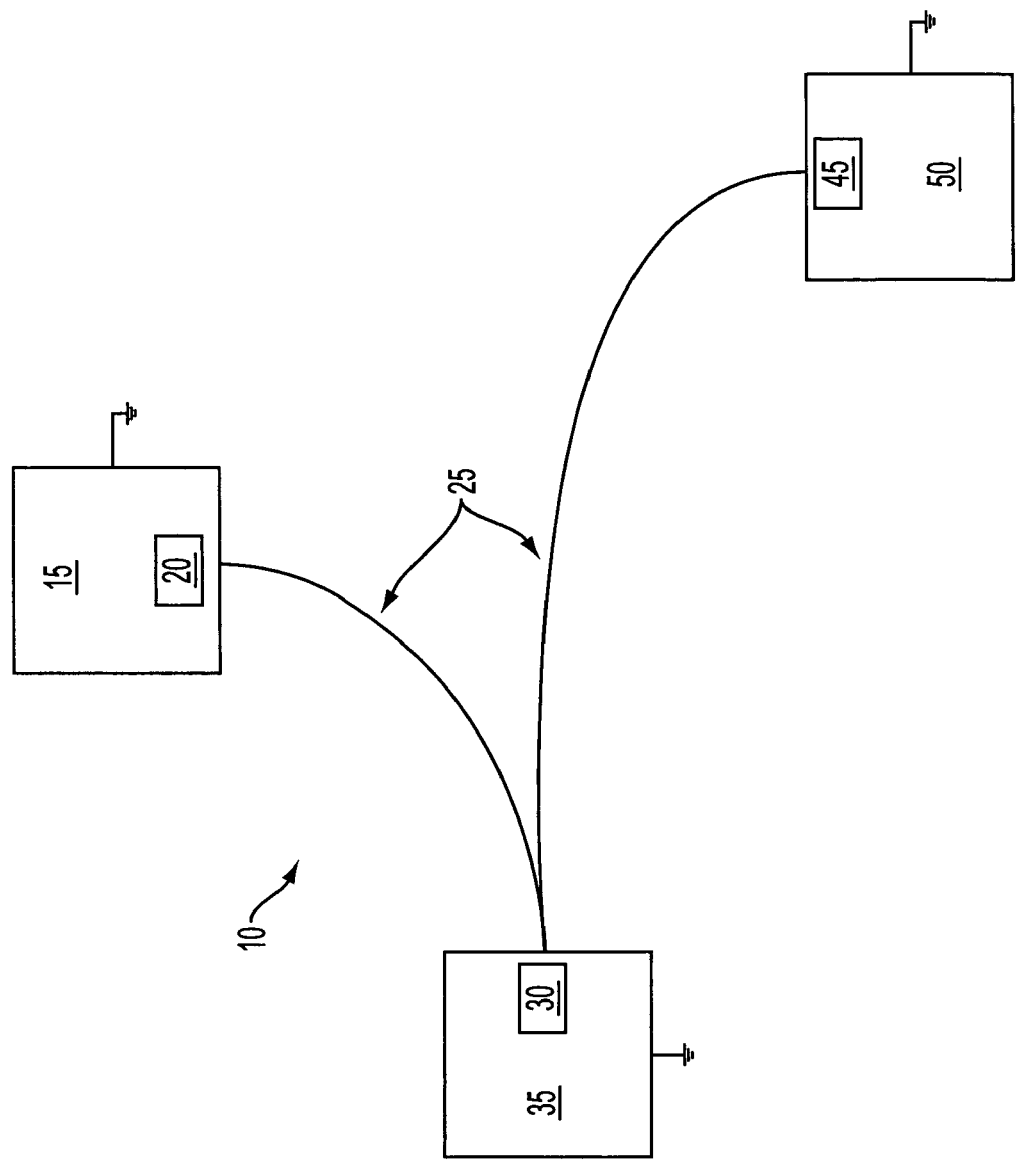
FIG. 1 is a system block diagram showing the electronic modules of an automobile connected together using busses connected to class II integrated circuits located on the electronic modules.

Each electronic module 15, 35, 50 has a class II integrated circuit mounted on its circuit board. The class II integrated circuits 20, 30, 45 of each of the electronic modules 15, 35, 50 are connected together through a single wire 25, which in conjunction with the vehicle ground structure forms the class II bus, thereby allowing all the electronic modules 15, 35, 50 to communicate with each other (see FIG. 1). The class II IC monitors the bus and receives or sends the applicable information required by the specific electronics module's 15, 35, 50 microcomputer (MCU) 17. The class II IC 20 sends data by either placing battery potential on the bus (logic one) 25 or by allowing the bus 25 to be pulled to a logic zero by the various 10 k ohm load resistors (shown in FIGS. 4 thru 6 as R2/R1) connected to the load pin 24 of the class II IC 20. The load pin 24 of the class II IC 20 is biased to the potential present on pin 1 of the class II IC 20. If pin 1 of the class IC 20 becomes high impedance, the load pin 24 of the class II IC 20 also becomes high impedance. The data received by the class II IC 20 is transmitted to the microcomputer MCU 17 via a serial or parallel data link 18. The microcomputer MCU 17 can be a processor, microprocessor or any of a number of processing means.

Figure 2:
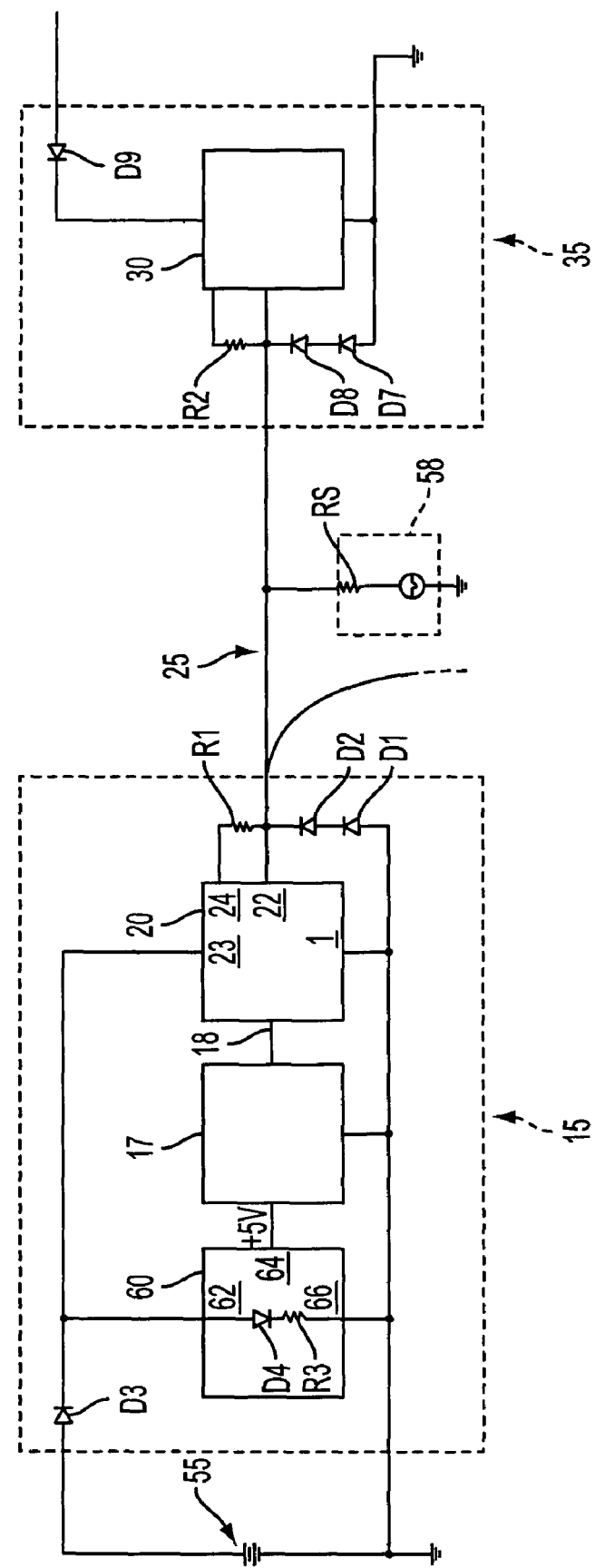
FIG. 2 is a schematic of a prior art class II bus negative transient protection circuit.

The bus pin 22 of the various class II IC's 20 may fail if a negative transient of a potential lower than −2 volts is applied to the BUS pin 22. The automotive industry has used a dual diode transient protection circuit to protect the integrated circuits 20 from negative transients (see FIG. 2). To protect the class II IC BUS pin 22 from negative transients, two diodes (D1/D2) are connected in series between ground and the bus pin 22. In a preferred embodiment, the diodes are each have a +0.6 volt voltage drop when forward biased. The BUS pin 22 of the class II integrated circuit 20 is connected to the cathode of diode D2. The class II integrated circuit 20 also has a ground pin 1 which is connected to the automobile ground. All the components are shown mounted on electronic assembly 15.

If a negative transient (represented here by 58 a negative pulsed voltage source and the associated source impedance resistor RS) is imposed on the BUS 25, the series diodes D1, D2, will forward bias and clamp the BUS to approximately −1.2v thereby protecting the class II IC BUS pin 22 from damage.

The following is a more detailed analysis. Diodes D1 and D2 are connected in series between ground pin 1 and the bus pin 22. When a voltage transient occurs on the bus 25 the bus pin 22 is pulled below ground. The negative voltage spike on bus pin 22 will forward bias diodes D1 and D2. The anode of diode D1 is connected to ground. Assuming a 0.6 Volt drop across diode D1 and again across diode D2, then the negative voltage on bus pin 22 is limited to −1.2 Volts. Thus, diodes D2 and D1 act as a voltage clamp, clamping pin 22 to −1.2 Volts.

The car battery 55 is typically a 12 volt battery, which is maintained between 14V and 16V by the charging system when the engine is running. The battery pin 23 of the class II integrated circuit 20 is connected to the car battery 55 through diode D3. Assuming the charging system maintains the battery at 14V, the voltage at the cathode of diode D3 is 13.4 Volts due to the 0.6 volt drop across diode D3. Resistor R1 performs two functions. When the battery 55 potential from the class II BUS pin 22 is disconnected, resistor R1 and the various other class II load resistors (e.g, R2) bias the bus pin 22 back to ground. Also, when the class II IC applies battery potential to BUS pin 22, resistor R1 limits current flow. Typically, resistor R1 and the other bus load resistors are 10 k ohms.

Figure 3:
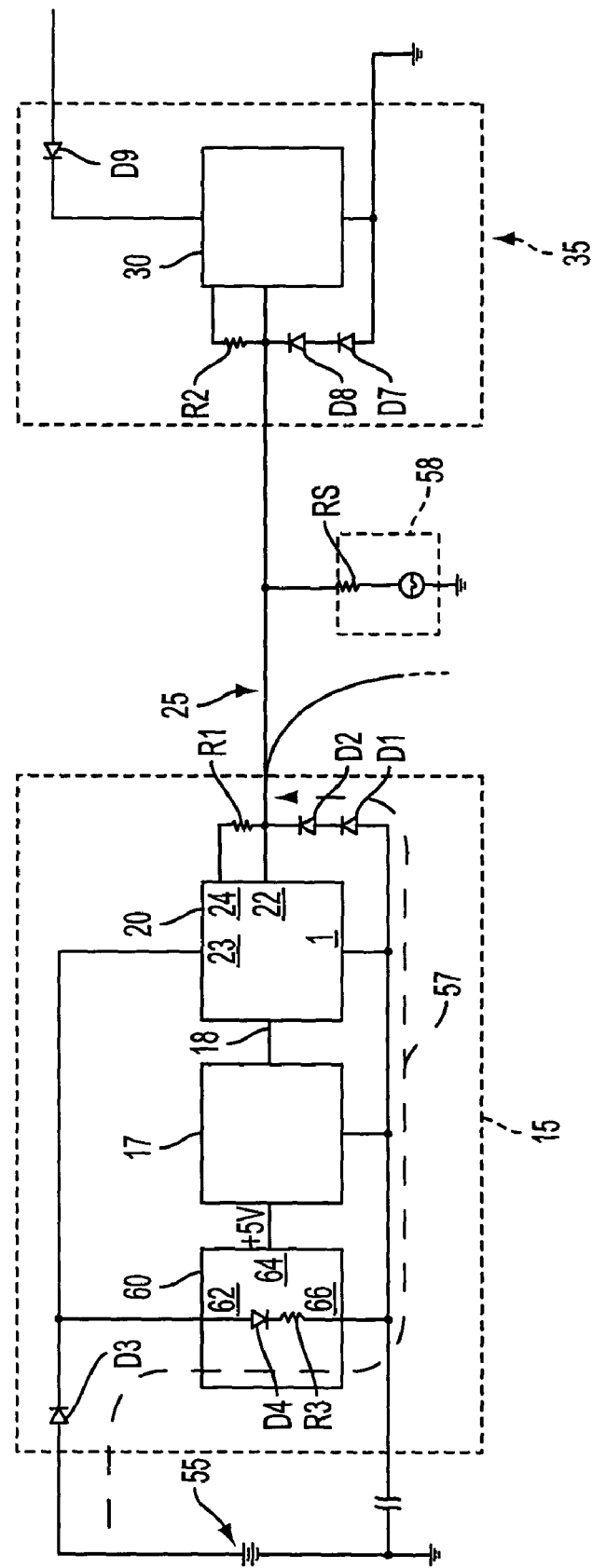
FIG. 3 is a schematic of a prior art class II bus negative transient protection circuit in which ground is open.

Unfortunately, this negative transient protection scheme can cause the bus 25 to be biased permanently to near battery potential when an open ground fault occurs at any of the connected electronic modules. With the bus 25 permanently biased to near battery potential, no bus communication can occur and the bus is under a "lock up" condition. When an open ground occurs in one of the electronic modules, the class II bus becomes improperly biased to near battery potential through the dual diode reverse battery protection circuit. FIG. 3 represents the condition with the open ground fault. This can happen when a wire breaks or a connector fails and the ground goes open circuit. Thus, a drawback to the negative transient protection provided by the dual series diodes (D1/D2) is the loss of class II communications if any one of the electronic modules 15, 35, 50 losses it ground connection. The loss of ground is shown by a break in the ground path at the bottom of FIG. 3. In this condition, the class II bus 25 becomes biased to logic one through one of many sneak paths. In FIG. 3 a typical sneak path 57 is shown as a dashed line with an arrowhead. The sneak path is formed as follows. Circuit 60 represents an electronic chip located on the same electronic assembly 15 as the class II integrated circuit 20. In this example, it is a +5 volt voltage regulator with an input 62 connected to the battery 55 through the cathode of blocking diode D3, a +5 Volt output pin 64 and a ground pin 66. A simplified model of the regulator 60 is represented, here by a diode D4 and a 4.7 k ohm resistor R3. The voltage at the cathode of diode D4 is about 12.8 volts assuming battery 55 is maintained at 14 volts.

As illustrated, current flows from battery 55 through the blocking diode D3, into the input 62 of the 5 volt regulator 60. Since the module ground is an open circuit, the current now flows out the GND pin 66 of the 5 volt regulator 60, through the two series diodes D1/D2 which are intended for negative transient protection, and biases the various load resistors (such as R1/R2) to logic one. As a result, BUS pin 22 becomes biased high. In FIG. 3, pin 22 is biased to around +8 volts, while the open ground floats at around +9 volts. It is noted that diodes D7, D8 and D9 on electronic module 35 perform the same functions as diodes D1, D2 and D3 on electronic module 15 respectively.

Now that the class II BUS 25 is biased to logic one through the low impedance sneak path, communication is no longer possible on the class II BUS 25 because the class II IC BUS 25 cannot be biased to a logic zero. That is, since the BUS pin 22 is biased high, pull down resistor R1 can't pull BUS pin 22 low. Consequently, lock up occurs. The sneak path through the battery input 62 of the 5 volt regulator 60 and out its ground 66 is representative of numerous sneak paths that could occur in the electronic module 15. Thus, when the module's ground is lost, the protection diodes D1 and D2 become a path for current to flow and the BUS pin 22 is pulled high or biased high or locked up.

Figure 4:
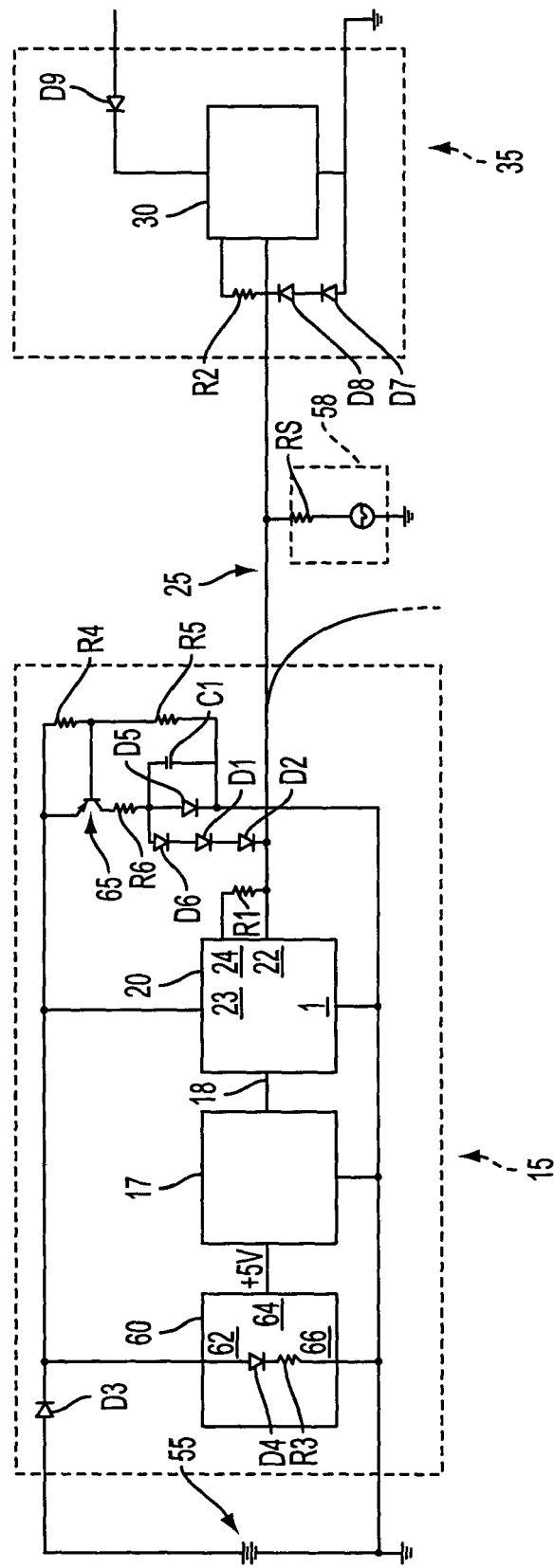
FIG. 4 is a schematic of the class II bus protection circuit of the present invention where the class II integrated circuit bus pin is clamped to −1.2 volts.
Figure 5:
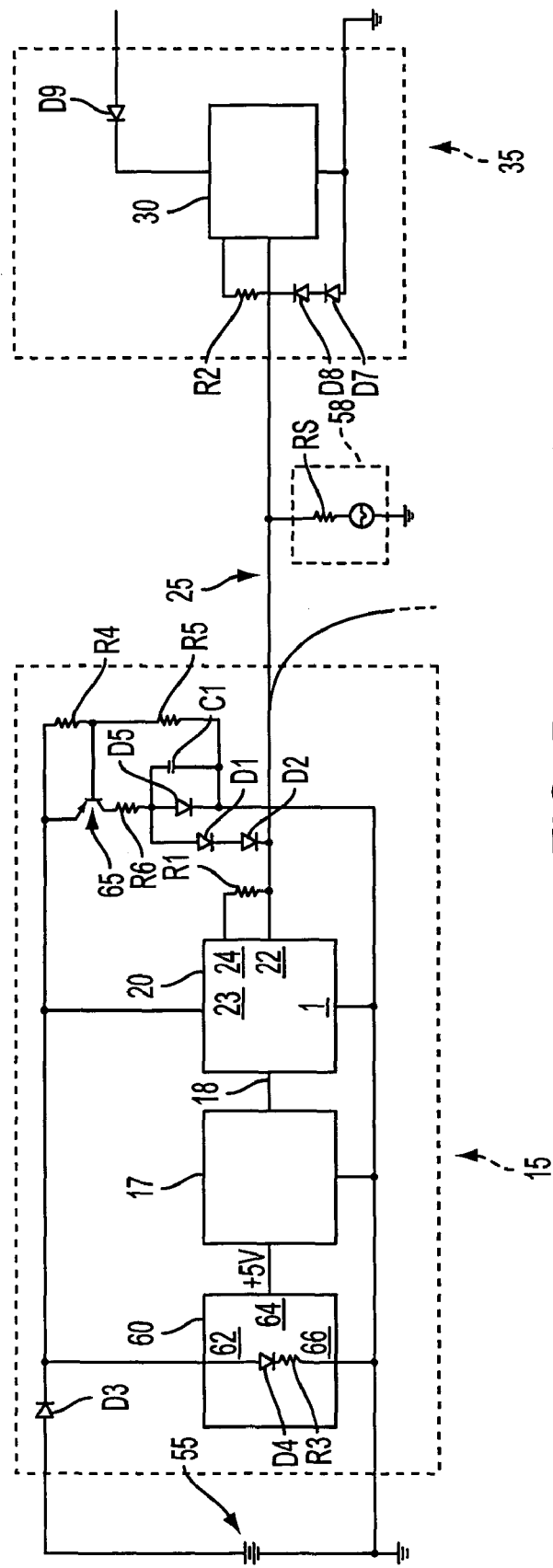
FIG. 5 is a schematic of the class II bus protection circuit of the present invention where the class II integrated circuit bus pin is clamped to a different voltage level than shown in FIG. 4.

To protect the class II IC BUS pin 22 from negative transients, the clamp circuit of the present invention is now biased from the battery 55 as opposed to ground. FIG. 4 illustrates the situation when the electronic module 15 in the present invention is grounded. PNP bipolar junction transistor 65 is biased in order that current may flow through the transistor 65 and allow a current conduction path from the cathode of D3 to R6. The transistor 65 can be biased as a current source or as a switch operably connected to a resistor in series to create a current. A variety of other devices which can be used in the present invention in place of, or with, the pnp bipolar junction transistor include relays, npn bipolar junction transistors, metal oxide semiconductor field effect transistors (MOSFET) and other similar devices. This transistor may be biased in saturation, or in the active mode. In this embodiment, the transistor is biased into saturation by resistors R4 and R5. In a preferred embodiment, both resistors R4 and R5 are 100 k ohms. In saturation, the collector voltage of transistor 65 is nearly equal to its emitter voltage which in a preferred embodiment is around 12.9 Volts. Resistor R6 biases the anode of diode D5 and capacitor C1 to a reference potential of approximately 0.6v above the ground potential. In a preferred embodiment, resistor R6 is 20 kohms. If a negative transient occurs on the class II BUS 25, the BUS pin 22 will be clamped to about −1.2v. The clamping is achieved as follows (see FIG. 5).

Current flows from through diode D3 forward biasing it on. The anode of diode D5 is connected to resistor R6. Current flows through transistor 65, through resistor R6 and through diode D5 to ground. Since the cathode of diode D5 is tied to ground and diode D5 is forward biased on, the anode of diode D5 is at a reference potential +0.6 volts above ground. Thus, diode D5 acts as a reference diode. Reference diode D5 is biased to form a voltage referenced to ground when the module ground is intact. When a negative transient appears on the bus 25, then diodes D1, D2 and D6 are forward biased. The anode of diode D6 is connected to the anode of diode D5 which is at +0.6 volts. Assuming a 0.6 Volt drop across diode D1 and again across diode D2, and across D6, then the voltage on BUS pin 22 is limited to −1.2 volts. Thus, diodes D1, D2 and D6 act as a voltage clamp, clamping pin 22 to −1.2 Volts. In the clamping condition, the current path is not from ground to BUS pin 22 as in the prior art. Instead, the current path is from battery 55 through diode D3, transistor 65, resistor R6, diodes D1, D2 and D6 to BUS pin 22. Other DC power sources can be used in place of a battery 55.

Capacitor C1 acts as a charge reservoir. If the transient pulls more current than can be sourced by resistor R6, capacitor C1 will supply the required current to allow the class II bus 25 to be clamped to approximately −1.2 volts until the transient condition has passed.

In another other preferred embodiment, additional series diodes can be placed in series with D1, D2 and D6. That is, additional series diodes or even a single zener diode can be used to clamp the bus pin 22 at a more negative voltage than −1.2v. In yet another preferred embodiment, the deletion of D2 or D6 can occur to clamp the bus pin 22 at a more positive voltage than −1.2v. The clamp voltage will be approximately determined by the expression clamp voltage=−0.6*(n−1), where n is the number of diodes in the series clamp string and n≧1. In this case n=2 therefore the clamp voltage will be approximately −0.6V (see FIG. 5).

Figure 6:
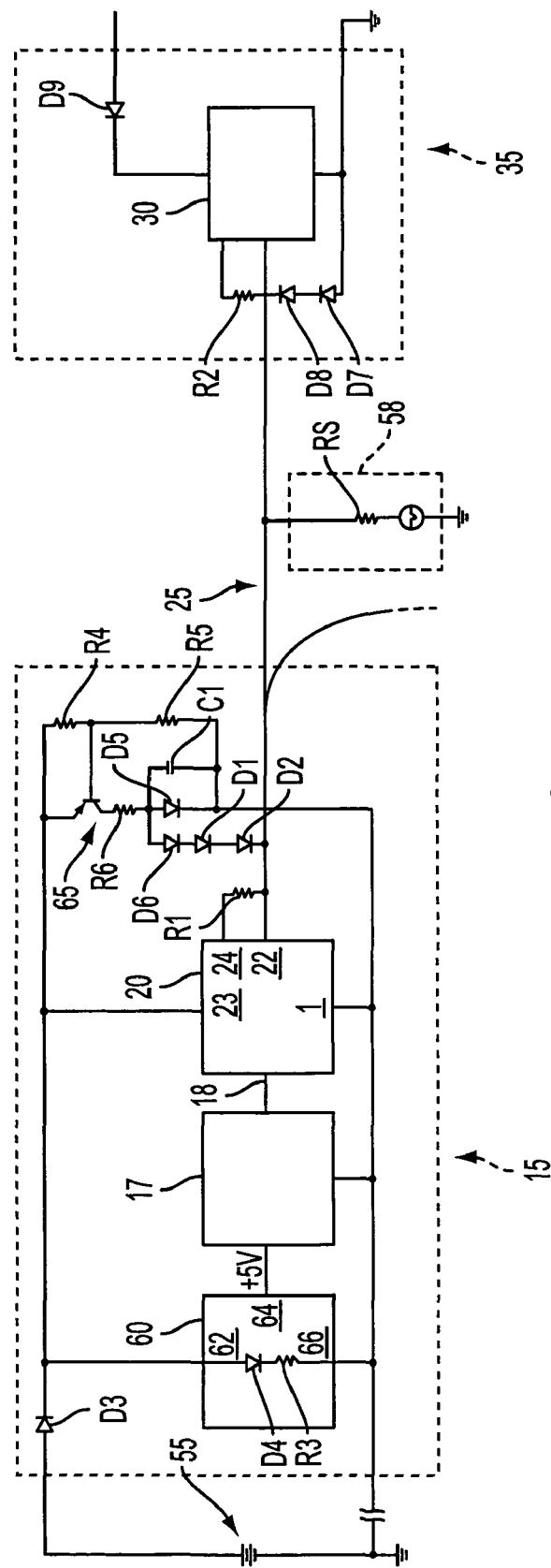
FIG. 6 is a schematic of the class II bus protection circuit of the present invention in which ground is open.

FIG. 6 represents the situation when the ground opens. The loss of ground is shown by a break in the ground path at the bottom of FIG. 6. To protect the class II bus 25 from being permanently biased to logic one during an open ground scenario, the negative transient protection circuitry is biased to battery 55, yet referenced to ground. When the module ground is lost, there is no longer a current path through R5 to ground and resistor R4 will bias transistor 65 off. As a result, the sneak path that previously existed through the 5 Volt regulator 60 to the class II BUS 25 is now broken in the present invention. The transistor 65 is biased so if the electronic module ground is lost, no current conduction will occur through the transistor to the class II bus 25. The current flow with an open ground is now described. Current flows from battery 55 through diode D3 through the regulator 60. The current flows into input 62 and out ground pin 66 of regulator 60 to the cathode of diode D5. The cathode of diode D5 is also connected to capacitor C1 and resistor R5. Under DC conditions, capacitor C1 looks like an open circuit and no current flows through it. Also, current won't flow through diode D5 since diode D5 is reverse biased. In addition, current won't flow through resistor R5 since transistor 65 is biased off and the junction between the base and the collector of transistor 65 is reversed biased. Thus, the current path from the ground of the 5 volt regulator 60 to the class II bus 25 is blocked by capacitor C1 (open circuit to DC), diode D5 (reversed biased), and the base collector of transistor 65 (reversed biased).

Since the sneak path is blocked from biasing the class II bus load resistors (represented by R1/R2), the bus pin 22 will not be biased high. Thus, although the electronic assembly 15 on which the class II integrated circuit 20 is mounted on won't operate due to the open ground, the other electronic assemblies 35, 50 won't be pulled high and the bus 25 can be driven to a logic zero or a logic one by the rest of the class II electronic modules 35, 50 which are on the network, allowing for normal communications.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A method of protecting an integrated circuit from a transient voltage, comprising:
   supplying battery current to a reference diode when a module ground is intact;
   biasing said reference diode to form a voltage referenced to ground; and
   clamping a bus pin to said voltage referenced to ground.

2. The method of protecting an integrated circuit from a transient voltage according to claim 1 further comprising the step of supplying current from a capacitor to clamp said bus pin until said transient voltage has passed.

3. The method of protecting an integrated circuit from a transient voltage according to claim 1 further comprising biasing a transistor into saturation, whereby a current is generated to bias said reference diode when said module ground is intact.

4. The method of protecting an integrated circuit from a transient voltage according to claim 1 further comprising biasing a transistor as a current source, whereby a current is generated to bias said reference diode when said module ground is intact.

5. A transient protection circuit, comprising:
a reference diode;
a transistor having an output terminal operably connected to an anode of said reference diode; and
at least a second diode operably connected between said anode of said reference diode and a bus pin, whereby said transistor supplies current when a module ground is intact.

6. The transient protection circuit according to claim 5 further comprising a capacitor operably connected in parallel with said reference diode.

7. The transient protection circuit according to claim 5 wherein said transistor is a pnp bipolar junction transistor.

8. The transient protection circuit according to claim 5 wherein said at least a second diode comprises a second and a third diode operably connected in series.

9. The transient protection circuit according to claim 5 wherein said a second diode comprises a second, a third and a fourth diode operably connected in series.

10. The transient protection circuit according to claim 6 wherein said a second diode comprises a second, a third and a fourth diode operably connected in series.

11. The transient protection circuit according to claim 7 wherein said a second diode comprises a second, a fourth and a fifth diode operably connected in series.

12. An electronic module, comprising:
an integrated circuit comprising a bus pin, a battery pin, and a ground pin; and
a transient protection circuit, comprising
a reference diode,
a transistor having an output terminal operably connected to an anode of said reference diode, and
a second diode operably connected between said anode of said reference diode and said bus pin of said integrated circuit, whereby said transistor supplies current when a module ground is intact.

13. The electronic module according to claim 12 further comprising
a bus having a first end and a second end, wherein said first end is operably connected to said bus pin of said integrated circuit and said second end is operably connected to another electronic module in an automobile electronics,
wherein said battery pin of said integrated circuit is operably connected to an automobile battery and said ground pin is operably connected to an automobile ground, and
wherein said integrated circuit is a class II integrated circuit.

14. The electronic module according to claim 12 further comprising a capacitor operably connected in parallel with said reference diode.

15. The electronic module according to claim 12 wherein said transistor is a pnp bipolar junction transistor.

16. The electronic module according to claim 12 wherein said second diode comprises a second and a third diode operably connected in series.

17. The electronic module according to claim 12 wherein said second diode comprises a second, a third and a fourth diode operably connected in series.

18. The electronic module according to claim 13 wherein said second diode comprises a second, a third and a fourth diode operably connected in series.

19. The electronic module according to claim 14 wherein said second diode comprises a second and a third diode operably connected in series.

20. The electronic module according to claim 14 wherein said second diode comprises a second, a fourth and a fifth diode operably connected in series.

* * * * *

UNITED STATES PATENT AND TRADEMARK OFFICE
CERTIFICATE OF CORRECTION

| | |
|---|---|
| PATENT NO. | : 7,061,734 B2 |
| APPLICATION NO. | : 10/653439 |
| DATED | : June 13, 2006 |
| INVENTOR(S) | : Gary E. Zack et al. |

Page 1 of 1

It is certified that error appears in the above-identified patent and that said Letters Patent is hereby corrected as shown below:

Column 7, line 21, Claim 9, after "said" insert --at least--.

Column 7, line 24, Claim 10, after "said" insert --at least--.

Column 7, line 27, Claim 11, after "said" insert --at least--.

Column 8, line 31, Claim 19, "a second" should be --the second--.

Signed and Sealed this

Twelfth Day of September, 2006

JON W. DUDAS
*Director of the United States Patent and Trademark Office*